Oct. 22, 1968  G. S. BLAIR ET AL  3,406,810
ROLLER SLAT CONVEYOR
Filed May 5, 1967  2 Sheets-Sheet 1
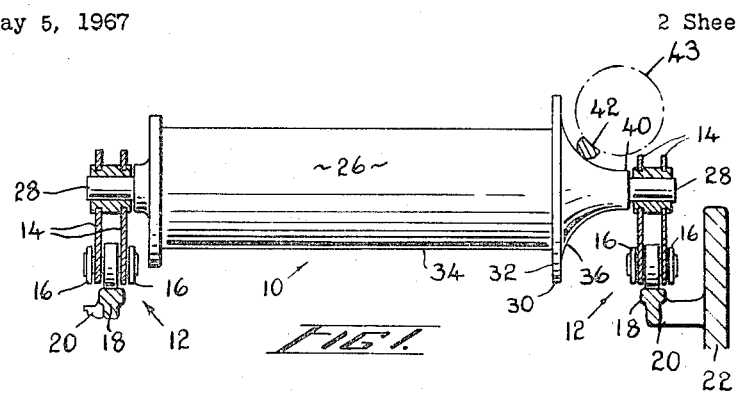
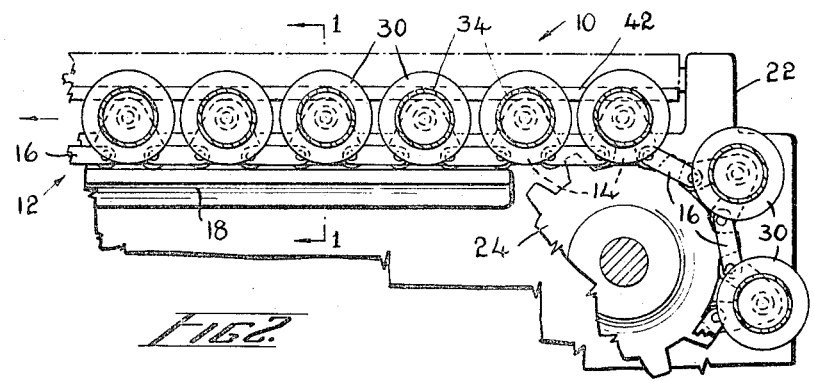
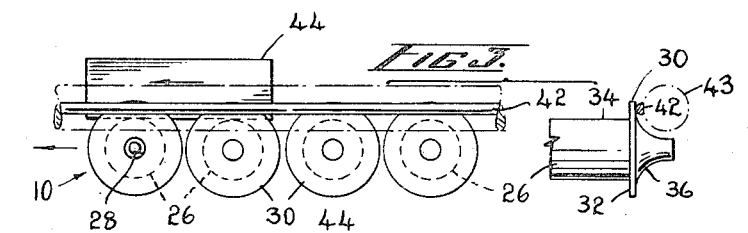
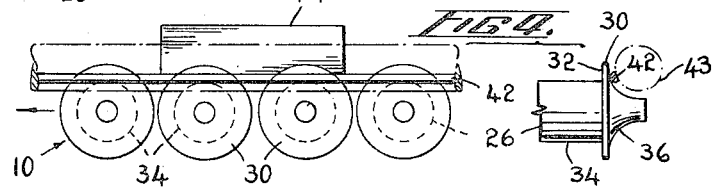
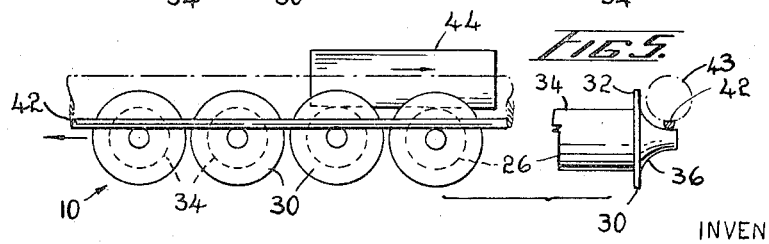
INVENTORS
George S. Blair
Harry Shaw
Joseph Maishlish
By Douglas A. Johnson
ATTORNEY Oct. 22, 1968  G. S. BLAIR ET AL  3,406,810
ROLLER SLAT CONVEYOR
Filed May 5, 1967  2 Sheets-Sheet 2
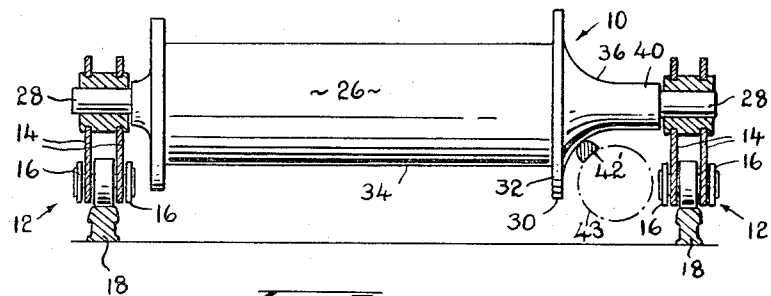
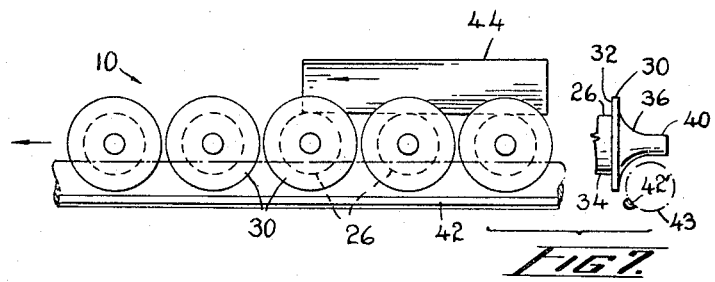
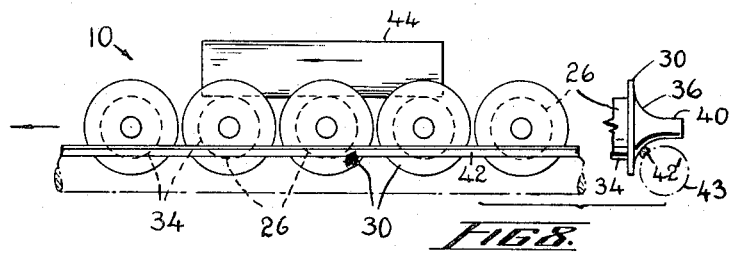
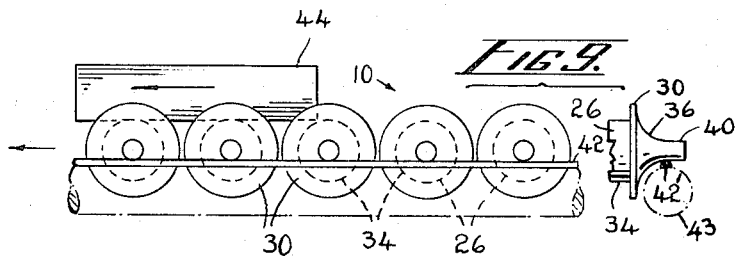
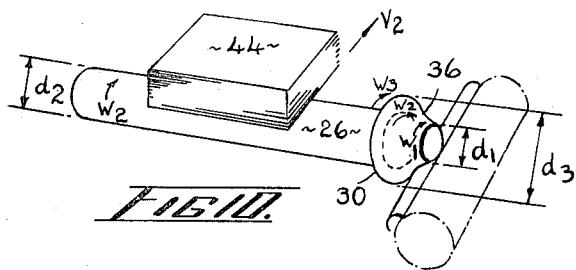
Inventors
George S. Blair
Harry Shaw
Joseph Maishlish
BY Douglas S. Johnson
ATTORNEY

United States Patent Office 3,406,810
Patented Oct. 22, 1968

3,406,810
ROLLER SLAT CONVEYOR
George S. Blair, Willowdale, Ontario, Harry Shaw, Aurora, Ontario, and Joseph Maishlish, Toronto, Ontario, Canada, assignors to Toronto Star Limited, Toronto, Ontario, Canada
Filed May 5, 1967, Ser. No. 636,315
3 Claims. (Cl. 198—183)

ABSTRACT OF THE DISCLOSURE

The speed of articles carried on a conveyor, formed of rollers moving horizontally at a constant speed, may be accelerated, retarded or reversed by tapering a corresponding end of the rollers and applying a brake member to a selected part of the tapered end either above or below the horizontal axis of the conveyor rollers.

Background of the invention (1) Field of the invention.—This invention relates to a device for controlling the movement of articles along a roller slat conveyor.

(2) Description of the prior art.—It is often necessary to control the movement of articles such as folded newspapers along a conveyor for the purpose, for instance of counting; in such circumstances it is desirable to enable the feed of newspapers to be stopped at a particular point for an indefinite time once the counting operation has been performed. It is then desirable to recommence the feed of newspapers down the conveyor as rapidly as possible to allow entry of succeeding newspapers. It will be understood that starting and stopping of the conveyor itself would be an impractical procedure and that such an operation would halt the subsequent processing of newspapers, e.g. packing, beyond the counting station.

In U.S. Patent 2,959,273 apparatus is described which achieves the object of enabling newspapers fed along a conveyor to be arrested for either a definite or indefinite period of time for the purpose of the counting without interrupting the feed up to or beyond the counting station.

The apparatus described in the above-mentioned patent consists in an arrangement of brake shoes disposed above and below the roller slats of the conveyor. The shoes are tied together and mounted for vertical movement, the feature being that the upper or lower shoes are selectively brought into engagement with the rollers to initiate a stationary platform at the selected point along the conveyor or alternatively to create a conveyor section moving at twice the conveyor speed for rapid ejection of the newspapers out of or past the station section.

In this arrangement independent application of the upper brake shoes causes instant creation of a stationary platform and independent application of the lower brake shoes causes the conveyor section to move at twice the conveyor speed. There is no intermediate speed of operation between these limits though in practice such would be desirable.

Furthermore, where a succession of operations take place along the conveyor, e.g. counting, sorting, folding or packing the order of such operations may be disrupted and it would be advantageous to provide for reversal of flow at certain sections of the articles back towards the supply station.

It is, therefore, one of the prime objects of the present invention to enable the speed of the articles being fed down a conveyor to be adjusted so that the feed may be selected at any level below or above that of the conveyor, as well as halted.

It is a further object of the invention to enable the feed of articles along a conveyor to be reversed along a selected section.

The particular feature of the invention resides in the provision of brake shoes to the ends of the rollers of the conveyor.

It is a further feature of the invention that the brake shoes may be applied independently at the ends of the rollers above or below the axis.

It is another feature of the invention that an end of each roller is provided with a flange which extends outwards with respect to the periphery of the rollers.

It is a further feature of the invention that the corresponding one end of each roller are tapered outwardly towards the axis of the roller, the brake shoes being applied independently above or below the horizontal axis at any selected point on the inclined surfaces in order to vary the speed of the travel of the articles on the selected section of the conveyor.

Summary of the invention

The invention consists in tapering outwardly the corresponding end of each roller and applying brake shoes independently above or below the horizontal axis at any selected point on the inclined surface.

Brief description of the drawings

The above objects and features will become apparent from the following detailed description taken in conjunction with the accompanying drawings, in which:

FIGURE 1 is a transverse elevation of one roller with a brake arrangement applied to the end of the roller above the axis and according to a preferred embodiment of the invention;

FIGURE 2 is a side elevation of a portion of a conveyor having rollers of the type shown in FIGURE 1;

FIGURES 3, 4 and 5 are diagrammatic representations illustrating the effect on the speed and direction of motion of an article on the conveyor as a result of differing positions of application of the brake to the end of a roller above its axis;

FIGURE 6 is similar to FIGURE 1 but illustrating the application of the brake to the end of a roller below its axis;

FIGURES 7, 8 and 9 are diagrammatic representations illustrating the effect on the speed of motion of an article on a conveyor as the result of differing of application of the brake to the end of a roller below its axis;

FIGURE 10 is a diagrammatic representation to illustrate the theory of the invention.

Description of the preferred embodiment

Wth reference to the drawings and more particularly FIGURE 2 a portion of a roller slat conveyor, generally designated by the numeral 10, is shown, this being of the type illustrated in U.S. Patent 2,959,273 issued Nov. 8, 1960 but it will be understood that the invention is applicable to any endless roller slat conveyor in which the rollers translated during conveyor operation are mounted for rotation. The diagrammatic representations in FIGURES 3, 4, 5, 7, 8 and 9 serve to illustrate the invention for the handling of newspapers in a newspaper mailing room, but while the description set forth hereafter makes reference to the handling of sheet material such as newspapers on the conveyor, it will be understood that such an application of the invention is for illustrative purposes only; the invention is equally applicable to the handling of packages, containers or other items whose movement is to be controlled along a conveyor without interrupting the conveyor feed.

The moving operation of the conveyor 10 comprises a pair of spaced endless chain like forms, generally designated at 12, in FIGURE 2. These endless elements 12 comprises a plurality of triangular bearing links 14 connected together by coupling links 16. As illustrated more particularly in FIGURE 1 the links 14 and 16 are supported by rails 18 mounted on supports 20 connected to a frame 22. The links 14 and 16 pass over end sprockets 24 only one of which is shown, the sprocket 24 being mounted on a suitable drive shaft, the details of which are omitted because it will be appreciated that it may take any desired form.

As illustrated more particularly in FIGURE 2 the endless conveyor mechanism 10 comprises in addition to the spaced endless elements 12 cross slats in the form of rollers 26 carrying shafts 28 journalled in the bearing links 14 of the endless chain element 12.

The roller slat conveyor 10 so far described is of conventional design and in itself forms no part of the present invention.

As illustrated more particularly in FIGURE 1 one end of each roller 26 has a flange 30, the inner face 32 of which extends outwardly in a direction substantially normal to the peripheral surface 34 of the roller 26. The outer surface 36 of the flange 30 is arcuately tapered with respect to the longitudinal axis of the roller 26, the tapered surface 36 eventually terminates in a substantially parallel portion 40 which is integral with the shaft 28 in the bearing link 14. While the tapered surface 36 is shown to be arcuate other configurations may be employed, viz. plane, the essence being that it should taper outwardly towards the longitudinal axis of the roller 26.

As illustrated more particularly in FIGURE 1 a brake member or shoe 42 bears against the tapered surface 36 above the longitudinal axis of the roller 26. The brake shoe 42 may be supported in many ways provided it meets the requirements of variable positioning on the tapered surface 36 above the longitudinal axis of the roller 26. One particular form of the brake shoe 42 is shown in FIGURES 1 and 3 for application to the tapered end of the roller 26 when the tapered surface 36 is arcuate; the brake shoe 42 is carried on a rotatable cylinder 43 which extends the required distance corresponding to the length of the section of rollers 26 to be subjected to the braking action. The brake shoe 42 may thus be applied to a selected point on the arcuate surface 36, or entirely removed therefrom, by manually or mechanically rotating the cylinder 43.

The effect of applying the brake member 42 to the surface 36 is diagrammatically illustrated in FIGURES 3, 4 and 5. The effect can be most easily understood by considering the representation in FIGURE 4 where the brake member 42 is applied to the brake surface 36 at a point on a plane corresponding with the upper peripheral surface 34 of the roller 26. As explained in U.S. Patent 2,959,273 the application of a brake member to the upper periphery of the rollers has the effect of holding them stationary against linear travel longitudinally of the conveyor; in the present arrangement since the brake member 42 is applied at a level corresponding to the uppermost peripheral plane it will be appreciated that the same result will be obtained and as illustrated in FIGURE 4 a bundle of newspapers 44 will be held in a stationary position even though the longitudinal movement of the conveyor is unaffected.

As illustrated in FIGURE 3 the application of the brake member 42 to the arcuate surface 36 at a point which lies above the horizontal plane corresponding to the uppermost peripheral surface 34 of the roller 26 produces less of an effect with the result that the linear travel of the newspaper bundle 44 is not stopped but only diminished, the amount being less as the brake member 42 is applied to the flange 30 at an increasing distance away from the upper peripheral surface 34 of the roller 26.

However, as shown diagrammatically in FIGURE 5 if the brake member 42 is applied to the arcuate surface 36 at a point which lies on a plane below that of the uppermost peripheral surface 34 of the roller 26 the effect is such that the linear travel of the newspaper bundle 44 is reversed as indicated by the direction of the arrow in the diagram.

FIGURE 5 illustrates the provision of a brake member 42' to the arcuate surface 36 at a point below that of the longitudinal axis of the roller 26. Again as explained in U.S. Patent 2,959,273 the application of a brake member to the lowermost peripheral plane of the roller has the effect of imparting twice the speed of the conveyor to a newspaper bundle. As illustrated diagrammatically in FIGURE 7 the same effect can be obtained by applying the brake member 42' to the arcuate surface 36 at a point which corresponds with the horizontal plane in which lies the lowermost peripheral surface 34 of the roller 26.

As illustrated in FIGURE 6 the application of the brake member 42' at a point on the arcuate surface 36 which is below that of the horizontal plane of the lowermost peripheral point of the roller 26 produces less of an accelerating effect.

In contrast and as illustrated in FIGURE 8 the application of a lower brake member 42' to the arcuate surface 36 at a point which lies on a plane between the lowermost peripheral point of the roller 26 and its longitudinal axis provides an even greater acceleration of the newspaper bundle 44 so that its speed of travel is well above that of twice the conveyor.

Hence, the angular contact position of the brake shoes 42 and 42' control the velocity and direction in which the articles 44 are transported on the conveyor 10. The brake shoes 42 and 42' may be applied at any point of the top or bottom arc respectively of the arcuate surface 36. Since the selected point is on a circle on the arcuate surface 36 of the conveyor 26 the relationship of such a circle diameter and the diameter of the conveyor rollers 26 equals the relation of the circumferential speed of the point on the circle and the surface speed of the conveyor roller 26. The conveyor speed on the conveyor roller 26 is equal to the sum of the travel speed of the conveyor chain 12 and the surface speed of the conveyor rollers 26. The rotation of direction of the conveyor rollers 26 is the same as the endless chain travel when the bottom brake shoe 42' is applied to the arcuate member and is opposite when the top brake shoe 42 is applied.

By way of further explanation reference is made to FIGURE 10 wherein $v_1$ is the constant speed of the endless chains 12 carrying the conveyor rollers 26, $v_2$ is the speed of travel of the bundle of newspapers 44, $d_1$ is the minimum diameter of the arcuate tapered end of the roller 26, $d_2$ is the diameter of the main body of the roller 26 and $d_3$ is the maximum diameter of the arcuate tapered end of the roller 26, $w_1$, $w_2$ and $w_3$ represent the circumferential speed respectively on the diameters $d_1$, $d_2$ and $d_3$.

For illustration of speed changes achieved the following practical example may be used:

The endless chains 12 carrying the conveyor rollers 26 and their integral arcuate members 36 travel at a constant speed $v_1=10$ in./sec. The roller diameter is $d_2=2$ inches and the arcuate member maximum diameter is 4 inches and its minimum diameter is 1 inch.

If the bottom brake shoe 42' is applied at the point of $d_3$ circle, the conveyor transporting speed will be:

$$v_2 = v_1 + v_1 \frac{d_2}{d_3} = 10 + \left(10 \times \frac{2}{4}\right) = 15 \text{ in./sec.}$$

If the brake shoe 42' is moved to the circle equalling $d_2$, the transporting speed will be:

$$v_2 = v_1 + v_1 \frac{d_2}{d_2} = 10 + 10 = 20 \text{ in./sec.}$$

If the brake shoes 42' is moved further to the smallest circle with the diameter $d_1$ the transporting speed is:

$$v_2 = v_1 + v_1\frac{d_2}{d_1} = 10 + \left(10\frac{2}{1}\right) = 30 \text{ in./sec.}$$

If the upper brake shoe 42 is applied at $d_3$ circle the transporting velocity is:

$$v_2 = v_1 - v_1\frac{d_2}{d_3} = 10 - \left(10 \times \frac{2}{4}\right) = 5 \text{ in./sec.}$$

If the brake shoe 42 is in contact with the arcuate member 36 at $d_2$ $$v_2 = v_1 - \left(v_1\frac{d_2}{d_2}\right) = 10 - 10 = 0 \text{ in./sec.}$$

If the brake shoe 42 is at $d_1$ $$v_2 = v_1 - \left(v_1\frac{d_2}{d_1}\right) = 10 - \left(10\frac{2}{1}\right) = 10 - 20 = -10 \text{ in./sec.}$$

the transport movement in this case is negative or, in other words, the transport of articles on the conveyor 10 has been reversed in opposite direction to the conveyor chain 12 travelling direction.

It is evident that the transporting speeds and the transport directions along parts of the conveyor 10 or all the length of the same may be controlled. It is also evident that speeds and direction of transport may be changed during the conveyor operation and without interruption in the conveyor chain movement. It is further evident that the brake shoes and their carrying members can be fixed to any desired position along the conveyor length. The conveying directions and speeds of the controlled portions of the conveyor 10 can be regulated in any desired order; thus defining any constant or changing direction of transport (forward or backward feed) and any constant or changing transport speed (standstill, acceleration, deceleration, slower than conveyor chain speed, same speed as conveyor chain 12 or higher than conveyor chain speed).

While certain embodiments have been illustrated and described for the purpose of disclosure, it will be understood that the invention is not limited thereto, but contemplates such modifications and other embodiments as may be utilized without departing from the invention.

We claim:

1. A roller slat conveyor having upper and lower reaches and having the roller slats thereof rotatable and freely supported, the corresponding one end of said rollers being tapered towards the longitudinal axis, independent brake shoe means disposed above and below said longitudinal axis and means for engaging said upper and lower brake shoe means against a selected position of said tapered surface.

2. Apparatus according to claim 1 wherein the corresponding ends of said rollers are each flanged substantially normal to the periphery and said tapered surface extends from said flange.

3. Apparatus according to claim 2 wherein said tapered surface is arcuate, the taper being progressively less approaching said axis.

References Cited
UNITED STATES PATENTS

| | | | |
|---|---|---|---|
| 2,779,441 | 1/1957 | Beltman | 188—62 |
| 2,959,273 | 11/1960 | Sykes | 198—183 |

RICHARD E. AEGERTER, *Primary Examiner.*